Nov. 10, 1964  E. L. BATTERTON ETAL  3,156,344
BALANCING MEANS FOR ELEVATOR RECEIVING CONVEYOR
Filed April 5, 1962  2 Sheets-Sheet 1
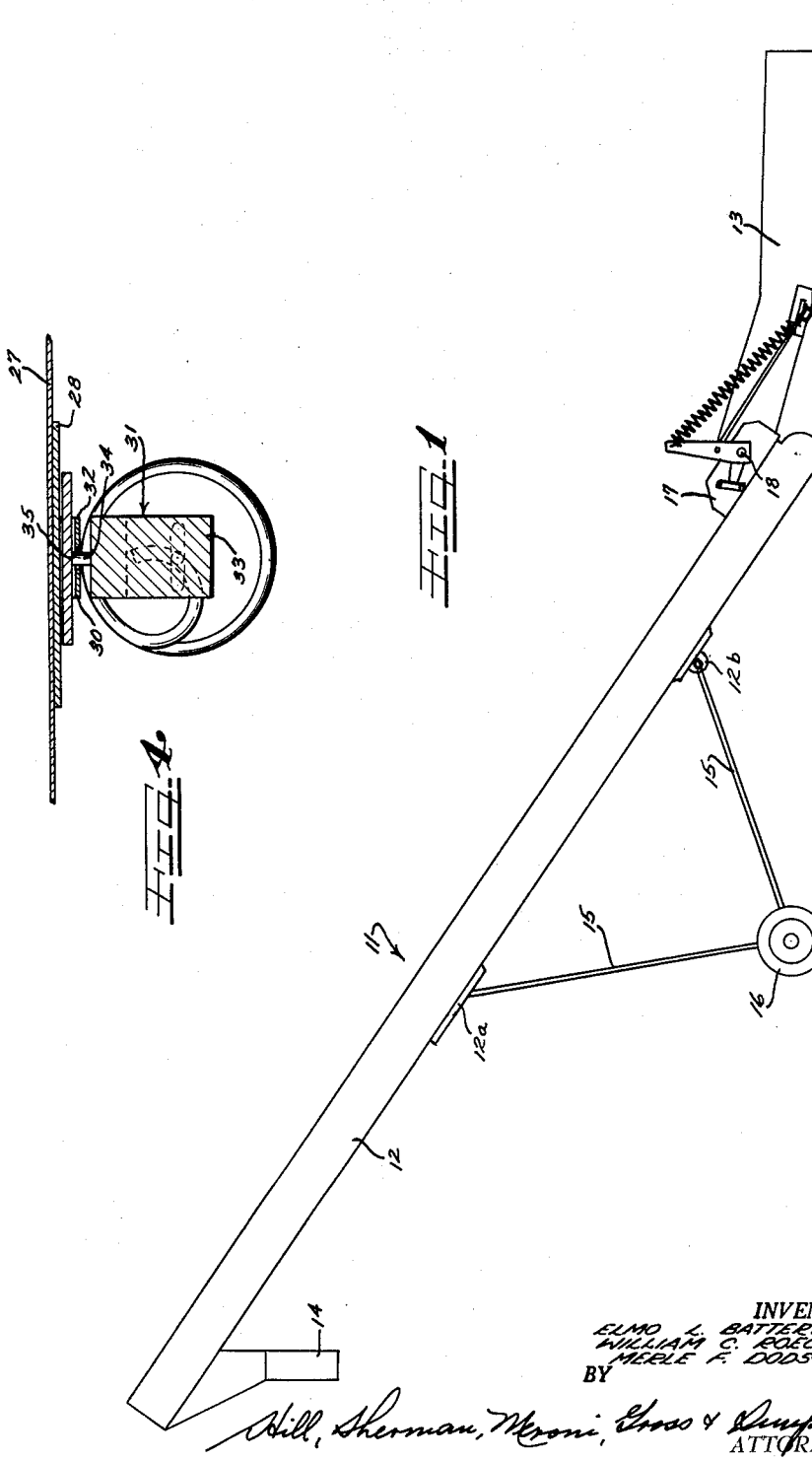
INVENTORS
ELMO L. BATTERTON
WILLIAM C. ROECKER
MERLE F. DODSON
BY
Hill, Sherman, Meroni, Gross & Simpson
ATTORNEYS

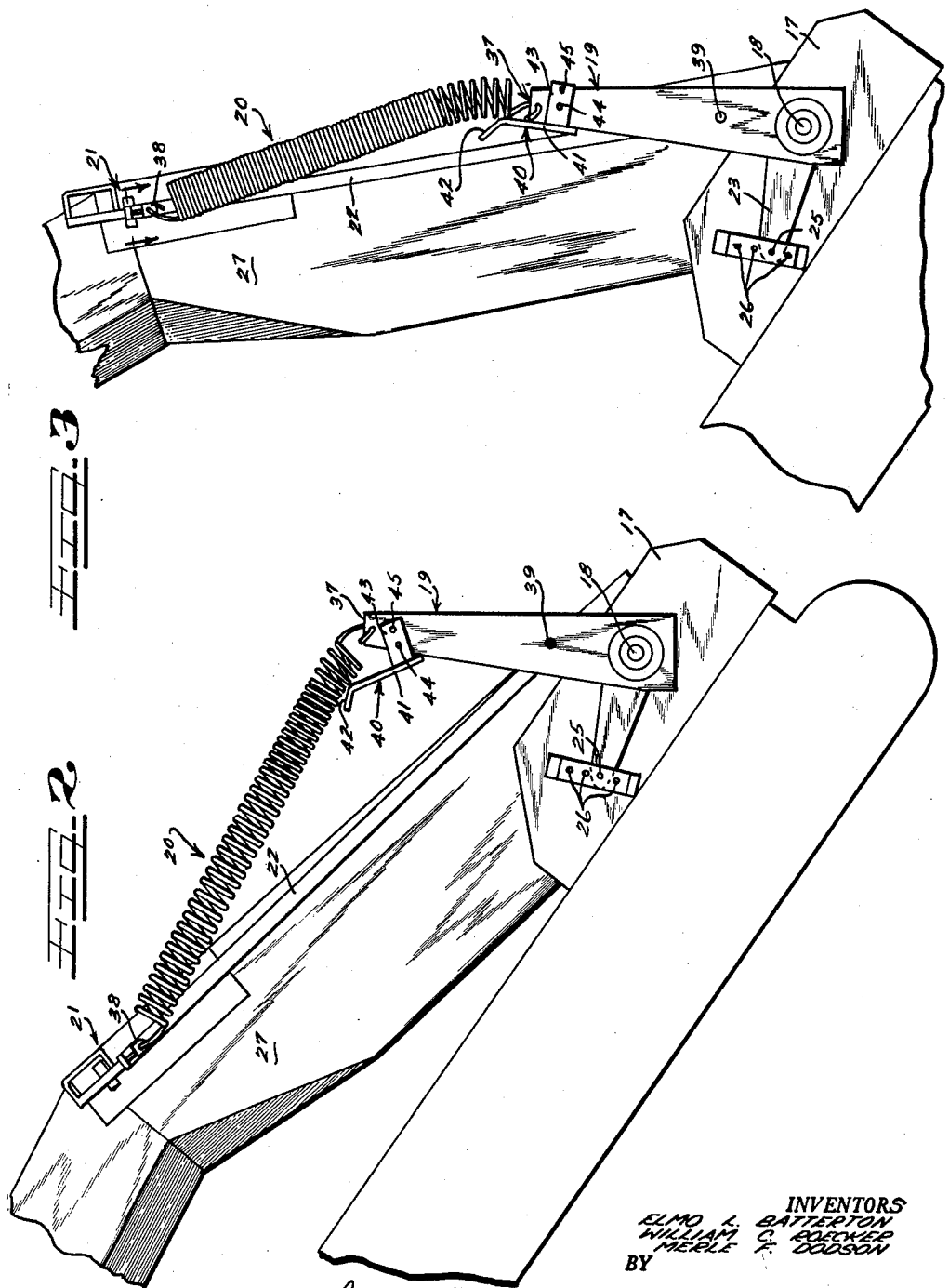

United States Patent Office 3,156,344
Patented Nov. 10, 1964

3,156,344
BALANCING MEANS FOR ELEVATOR
RECEIVING CONVEYOR
Elmo L. Batterton and William C. Roecker, Morton, and Merle Franklin Dodson, East Peoria, Ill., assignors, by mesne assignments, to Meyer Mfg. Co., a corporation of Illinois
Filed Apr. 5, 1962, Ser. No. 185,330
15 Claims. (Cl. 198—91)

This invention relates to elevators and is more particularly directed to portable elevators having a pivoted hopper associated therewith.

Bucket elevators or the like include generally an elevating section having a plurality of buckets or ribs slidably seated on the upper and lower surfaces of the elevating section which are coupled together and driven by an endless chain or belt or the like to move the buckets or ribs and the objects supported or engaged thereby from one end of the elevating section to the other. In portable elevators the elevating section is generally supported by wheels intermediate the lower and raised portions of the elevating section.

It is now commonplace to provide a generally horizontally extending receiving hopper at and connected to the lower end of the elevating section to provide a convenient means for feeding material to the elevating section. In portable elevators however it is necessary to provide a means for laying back the hopper on the elevating section or disconnecting the hopper from the elevating section so that the elevator can be transported from one location to another. Generally, manufacturers and operators alike have preferred the arrangement wherein the hopper is pivotally mounted on the lower end of the elevating section so that it can be folded back on the elevating section for transport without disconnecting the belt or chain drive therebetween.

It will be understood however that receiving hoppers employed in many elevators are extremely heavy and may weigh in the realm of several hundred pounds. For this reason operators have long sought a simple but efficient means of facilitating pivotal movement of the hopper with respect to the elevating section from one desired position to another. In order to obviate the problems encountered in pivoting the hopper on the elevating section, manufacturers have in the past used heavy duty tension springs to interconnect the hopper with the elevating section to produce the force required to initiate pivotal movement of the hopper on the elevating section. Such hopper spring suspension has not been very satisfactory however, since the springs become practically useless when the hopper has been pivoted through an arc of 30° or so since at this point in the pivotal arc the tension springs have lost practically all of their tension and are of no further practical aid in counteracting the weight of the hopper.

We have devised an equipoising mechanism for suspending the hopper which is simple and yet quite effective in counteracting the weight of the hopper even through a pivotal arc of 90°. The hopper of an elevator constructed in accordance with the principles of our invention can be lifted from its horizontal to its vertical position with a very small force and can also be held in any intermediate position with a like small force. The suspension system which we have devised also serves to aid the operator in lifting the hopper from the folded transport position to a vertical position and yet is so designed that it can be employed to hold the hopper in a semi-folded almost vertical position.

In view of the foregoing it is a principal object of our invention to provide an improved portable elevator employing a pivotally mounted hopper and an equipoising mechanism interconnecting the elevating section and the hopper.

Another and more specific object of our invention resides in the provision of a means for counterbalancing the weight of a hopper by means of a spring suspension system.

These and other objects and advantages of our invention will appear from time to time as the following specification proceeds and with reference to the accompanying drawings, wherein:

FIGURE 1 is a side elevational view of an elevator constructed in accordance with the principles of our invention and showing the hopper in a generally horizontally extending position;

FIGURE 2 is a fragmentary side elevational view of the elevator shown in FIGURE 1 but showing the hopper in a folded transport position;

FIGURE 3 is a fragmentary side elevational view which is similar in nature to FIGURE 2 but which shows the hopper in a semi-folded almost vertical position; and FIGURE 4 is a fragmentary sectional view taken along lines IV—IV of FIGURE 3 and showing a detail of one portion of the equipoising mechanism.

FIGURE 1 of the drawings shows a typical elevator 10 comprising an elevating section 12 having a hopper 13 pivotally mounted on the lower end thereof and having a chute 14 connected to the upper end thereof. The elevating section 12 is maintained in an inclined position by supports 15 which are in turn connected to an axle (not shown) on which wheels 16 are mounted. It will also be understood that sliding support and pivot means 12a and 12b, respectively, are generally provided for positioning the elevating section in different inclined positions.

The elevating section 12 has face plates 17 mounted on opposite sides of the trough which is formed therein and these plates are fixed to the lower end of the elevating section 12 and serve as journals for opposed ends of a shaft 18. The shaft has lock nuts threaded on the outer ends thereof to maintain the shaft in its journaled position within the face plates 17. The shaft 18 in turn extends through suitable receiving apertures formed in an end of the hopper 13 to pivotally mount the hopper 13 on the elevating section 12.

The equipoising mechanism which we have developed to facilitate pivotal movement of the hopper 13 with respect to the elevating section 12 comprises generally a pair of fixed supporting legs 19, a pair of tension springs 20, a pair of slides 21, and a pair of slide arms 22. It should be noted at this juncture that the elevator which is constructed in accordance with our invention has identical components mounted on the opposite side of the elevator from that shown in the drawing and that, for the sake of simplicity, only one set of these components is hereafter described.

The supporting leg 19 is mounted for pivotal movement on the shaft 18 and is fixedly mounted to a link arm 23. A strap 24 has its outer ends welded or otherwise rigidly secured to the outer surface of the face plate 17 and has its center section overlying the outermost end of the link arm 23. A pin 25 extends through one of several apertures 26 and through an aperture in the outer end of the link 23 to maintain that arm and therefore the supporting leg 19 in a fixed position.

A side wall 27 of the hopper 13 has a plate 28 mounted thereon and secured thereto by welding or the like and this plate, in turn, has a strap or track 30 mounted thereon. The track 30 is spaced slightly from the plate 28 along the greater part of its length but has its ends welded or otherwise rigidly secured to the plate 28.

A spring connection means or slide 31 has a base 32, a head 33, and a narrow neck 34 interconnecting the base and head. The base rides along the plate 28 between that plate and the track 30 and the neck 34 extends through an elongated slot 35 formed in the track 30. It will be observed that the track 30 is mounted on the hopper substantially along a radius extending from the pivot shaft 18. Thus, the slide 31 is guided for movement along the track by the slide 35 toward and away from the pivot shaft 18. In addition, a handle 36 is formed integrally with the slide 31 and serves to provide the operator with the means for raising the hopper from the horizontal to the vertical or collapsed position.

The tension spring 20 has one end connected at 37 to the outer free end of the leg 19 on the elevating section 11 and has its opposite end connected to a tab 38 integral with the slide 31. The equipoising feature of our invention is attained through the use of the slide arm 22 in conjunction with the other elements above described. The arm 22 has one end pivotally connected by a pin 39 with the leg 19 of the elevating section 11 intermediate the ends of the leg and has its opposite end pivotally connected to the slide 31.

It will be observed that inasmuch as the arm connection point at pin 39 is spaced from the hopper pivot shaft 18 and intermediate that shaft and the spring connection point 37, the force of spring 20 will tend to bias the hopper 13 to pivot in a counterclockwise direction from its horizontal position (FIGURE 1) toward the semi-collapsed or nearly vertical position of FIGURE 3. As the hopper pivots from the horizontal, the arm 22 will act to move the slide 31 in the direction of the outer free end of the hopper and such slide movement will act to minimize shortening of the distance between the spring connection points on the leg 19 and the slide 31 to thereby minimize strength loss in the spring 20 which would otherwise be caused by pivotal movement of the hopper toward the position shown in FIGURE 3.

The pivot pin 39 for the arm 22 has been positioned in the leg 19 at a point about one-third of the distance from the pivot shaft 18 to the point of spring connection 37 but this position could of course be altered somewhat if deemed necessary to provide the equipoising mechanism with slightly different operating characteristics. The position shown is believed to be an optimum position inasmuch as it provides the spring 20 with good leverage while still serving to permit the arm 22 to minimize the strength loss in the spring caused by pivotal hopper movement.

When the elevator 10 is readied for transport it is desirable to pivot the hopper 13 to the collapsed position shown in FIGURE 2. If the leg 19 is maintained in the vertical position shown in FIGURE 2 the spring 20 will resiliently suspend the hopper 13 in its collapsed position. In addition, the spring 20 will of course aid the operator in moving the hopper 13 from its collapsed position to the horizontal position by counteracting the weight of the hopper.

The leg 19 is maintained in a fixed position during pivotal hopper movement. Since the spring 20 is designed to counteract the weight of the hopper 13 when the hopper is both in a horizontal and collapsed position, it is desirable that the leg 19 be maintained in a vertical or nearly vertical position. The arm 23 and strap 24 cooperate to permit such positioning of the leg 19. It will be understood by those adept in this art that the elevating section is generally designed to be supported in a number of different inclined positions. Since the leg 19 is mounted on the elevating section and since it is desirable to maintain the leg 19 in a vertical position regardless of the angle of inclination of the elevating section 12, we have pivotally mounted the leg 19 on the elevating section 12. Once the angle of inclination of the elevating section 12 has been determined the operator can then remove the pin 25 from strap 24 and arm 23, rotate the leg 19 about the pivot shaft 18 until it is standing in a vertical position, and then reinsert the pin 25 through the arm 23 and an adjacent aperture 26 in the strap 24. This being completed, the equipoising mechanism is now in an operable position. The leg 19 need not then be pivoted again on the shaft 18 so long as the elevating section 12 is maintained at the same angle of inclination.

Lastly, we have provided a spring stop 40 which comprises, a finger 41 having an outturned upper end 42 and having a U-shaped bracket 43 made integral therewith and embracing the upper end of the leg 19. The bracket 43 has apertures 44 and 45 formed therein, the apertures 45 being formed adjacent the outer free end of the bracket 43. In normal usage the spring stop 40 will be maintained in the position shown in FIGURE 3 by a pin extending through the aperture 44 and a center aperture in the upper end of the leg 19. In this position of the spring stop 40, the finger 41 will extend upwardly past the uppermost end of the leg 19 and will engage the spring 20 when the hopper 13 is pivoted to the vertical or nearly vertical position to prevent collapsible movement of the hopper.

When the operator wishes to move the hopper 13 to the collapsed position shown in FIGURE 2 the spring stop 40 can be repositioned as shown in FIGURE 2 with a pin or cotter key extending through the aperture 45 in the bracket 43 and the same single central aperture formed at the upper end of the leg 19 so that the finger 41 leans backwardly as shown in FIGURE 2. In this position of the spring stop 40 the finger 41 will not prevent counterclockwise pivotal movement of the hopper 13 from the vertical to the collapsed position shown in FIGURE 2. The spring stop 40 would of course preferably be moved from the position shown in FIGURE 3 to the position shown in FIGURE 2 with the hopper in the horizontal position.

It will be understood that this embodiment of our invention has been used for illustrative purposes only and that various modifications and variations in the present invention may be effected without departing from the spirit and scope of the novel concepts hereof.

We claim as our invention:

1. An elevator comprising:
   an inclined elevating section having a hopper pivotally mounted on the lower end thereof,
   spring means interconnecting said elevating section with said hopper to urge said hopper to collapse upon said elevating section,
   and means for varying the point of spring connection on said hopper as a function of the pivoted position of said hopper with respect to said elevating section.

2. An elevator comprising:
   an inclined elevating section having a hopper pivotally mounted on the lower end thereof,
   a tension spring having one end connected to said elevating section intermediate its ends,
   a spring connection mounted on said hopper for slidable movement therealong toward and away from the point of pivotal connection between said hopper and said elevating section,
   means interconnecting said spring connection and the opposite end of said spring,
   and means for sliding said spring connection along said hopper as a function of the pivoted position of said hopper with respect to said elevating section.

3. An elevator comprising:
   an inclined elevating section having a hopper pivotally mounted on the lower end thereof,
   a tension spring having one end connected to said elevating section intermediate its ends,
   a spring connection mounted on said hopper for slidable movement therealong toward and away from the point of pivotal connection between said hopper and said elevating section,
   means interconnecting said spring connection and the opposite end of said spring,
   and means for sliding said spring connection along said hopper and away from the point of pivotal connection between said hopper and said elevating section when said hopper is pivotally moved from a horizontal to a generally vertical position.

4. An elevator comprising:
an inclined elevating section having a hopper pivotally mounted on the lower end thereof,
a tension spring having one end connected to said elevating section intermediate its ends,
a spring connection mounted on said hopper for slidable movement therealong toward and away from the point of pivotal connection between said hopper and said elevating section,
means interconnecting said spring connection and the opposite end of said spring,
and means for maintaining a constant predetermined distance between a point on said inclined elevating section intermediate the ends of said elevating section and said spring connection.

5. An elevator comprising:
an inclined elevating section having a hopper pivotally mounted on the lower end thereof,
a tension spring having one end connected to said elevating section intermediate its ends,
a spring connection mounted on said hopper for slidable movement therealong toward and away from the point of pivotal connection between said hopper and said elevating section,
a lever arm having one end pivotally mounted on said elevating section intermediate the ends of said elevating section,
means pivotally interconnecting the opposite end of said arm with said spring connection,
and means interconnecting said spring connection and the opposite end of said spring.

6. An elevator comprising:
an inclined elevating section having a hopper pivotally mounted on the lower end thereof,
a leg having one end mounted on said elevating section,
means fixedly mounting said leg in different angular positions relative to said elevating section,
a tension spring having one end connected to a free end of said leg,
a spring connection mounted on said hopper for slidable movement therealong toward and away from the point of pivotal connection between said hopper and said elevating section,
means interconnecting said spring connection and the opposite end of said spring,
and means for sliding said spring connection along said hopper as a function of the pivoted position of said hopper with respect to said elevating section.

7. An elevator constructed in accordance with claim 6 wherein said last named means comprises an arm having its opposed ends pivotally connected to said spring connection and said leg intermediate the ends of said leg.

8. An elevator comprising:
an inclined elevating section having a hopper pivotally mounted on the lower end thereof for movement at least from a generally horizontal to a generally vertical position,
a leg pivotally mounted on said elevating section,
means fixedly mounting said leg in a vertical position regardless of the angle of inclination of said elevating section,
a tension spring having one end connected to said leg,
a spring connection mounted on said hopper for slidable movement therealong toward and away from the point of pivotal connection between said hopper and said elevating section,
means interconnecting said spring connection and the opposite end of said spring,
and means for sliding said spring connection along said hopper as a function of the pivoted position of said hopper with respect to said elevating section.

9. An elevator constructed in accordance with claim 8 wherein said last named means comprises an arm having its opposed ends pivotally connected respectively to said spring connection and said leg intermediate the ends of said leg.

10. An elevator comprising:
an inclined elevating section having a hopper pivotally mounted on the lower end thereof,
a track running along said hopper in a radial direction relative to the point of pivotal interconnection between said elevating section and said hopper,
a slide slidably mounted on said track,
a tension spring having one end connected to said elevating section intermediate its ends and having its opposite end connected to said slide,
and means for moving said slide along said track as a function of the pivoted position of said hopper with respect to said elevating section.

11. An elevator comprising:
an inclined elevating section having a hopper pivotally mounted on the lower end thereof for movement at least from a generally horizontal to and through a generally vertical position,
a leg pivotally mounted on said elevating section,
means fixedly mounting said leg in a vertical position regardless of the angle of inclination of said elevating section,
a tension spring having one end connected to said leg,
a spring connection mounted on said hopper for slidable movement therealong toward and away from the point of pivotal connection between said hopper and said elevating section,
means interconnecting said spring connection and the opposite end of said spring,
means for sliding said spring connection along said hopper as a function of the pivoted position of said hopper with respect to said elevating section,
whereby said spring travels through a generally arcuate path as said hopper is pivotally moved from a horizontal to and through a generally vertical position,
and means positionable in the path of arcuate movement of at least a portion of said spring to limit the degree of pivotal movement of said spring and thereby of said hopper.

12. An elevator comprising:
an inclined elevating section having a hopper pivotally mounted on the lower end thereof for movement from a generally horizontal to and through a generally vertical position,
a spring interconnecting said elevating section with said hopper to urge said hopper to collapse upon said elevating section,
whereby said spring travels through a generally arcuate path as said hopper is pivotally moved from a horizontal to and through a generally vertical position,
and means positionable in the path of arcuate movement of at least a portion of said spring to limit the degree of pivotal movement of said spring and thereby of said hopper.

13. An elevator comprising:
an inclined elevating section having a hopper pivotally mounted on the lower end thereof for movement from a generally horizontal to and through a generally vertical position,
a spring interconnecting said elevating section with said hopper to urge said hopper to collapse upon said elevating section,
and means for varying the point of spring connection on said hopper during pivotal movement of said hopper on said elevating section,
whereby said spring travels through a generally arcuate path as said hopper is pivotally moved from a horizontal to and through a generally vertical position,
and means positionable in the path of arcuate movement of at least a portion of said spring to limit the degree of pivotal movement of said spring and thereby of said hopper, 14. An elevator comprising:
an inclined elevating section having a hopper pivotally mounted thereon and adapted to be moved from a horizontal to and through a vertical position,
a leg mounted on said elevating section and having a free end extending above the pivotal axis of said hopper,
a track mounted on said hopper along a pivot radius of said hopper,
a slide retained on and slidable along said track,
a compression spring interconnecting said slide with said free end of said lever, and
an arm having one end connected to said slide and its opposite end connected to said leg at a point spaced above the pivotal axis of said hopper and below the point of spring connection on said leg.

15. An elevator constructed in accordance with claim 14 including means for adjustably mounting said leg in any one of several fixed angular positions relative to said inclined section.

References Cited by the Examiner
UNITED STATES PATENTS 1,165,460   12/15   Steele _____ 198—98

SAMUEL F. COLEMAN, *Acting Primary Examiner.*
WILLIAM B. LA BORDE, *Examiner.*